United States Patent
Wolford

(10) Patent No.: US 12,228,990 B2
(45) Date of Patent: Feb. 18, 2025

(54) BASEBOARD MANAGEMENT CONTROLLER POWER DELIVERY

(71) Applicant: LENOVO ENTERPRISE SOLUTIONS (SINGAPORE) PTE. LTD., Singapore (SG)

(72) Inventor: Robert R. Wolford, Strongsville, OH (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 33 days.

(21) Appl. No.: 18/193,865

(22) Filed: Mar. 31, 2023

(65) Prior Publication Data
US 2024/0329709 A1   Oct. 3, 2024

(51) Int. Cl.
*G06F 1/26*   (2006.01)
*G06F 1/30*   (2006.01)
*G06F 1/3203*   (2019.01)

(52) U.S. Cl.
CPC .............. *G06F 1/30* (2013.01); *G06F 1/3203* (2013.01)

(58) Field of Classification Search
CPC ........................................................ G06F 1/30
USPC ............................................................ 713/300
See application file for complete search history.

(56) References Cited

U.S. PATENT DOCUMENTS

| | | | |
|---|---|---|---|
| 10,938,294 B1* | 3/2021 | Chin | H04N 23/651 |
| 2004/0120089 A1* | 6/2004 | Temesi | H02M 7/125 |
| | | | 361/93.1 |
| 2007/0059016 A1* | 3/2007 | Sato | H02M 3/33507 |
| | | | 399/88 |
| 2010/0301828 A1* | 12/2010 | Shi | H02H 3/24 |
| | | | 323/299 |
| 2011/0050183 A1* | 3/2011 | Ginet | H02P 9/102 |
| | | | 322/86 |
| 2013/0170311 A1* | 7/2013 | Lai | H02J 7/345 |
| | | | 365/228 |
| 2016/0354680 A1* | 12/2016 | Bartels | A63F 3/00643 |
| 2017/0244236 A1* | 8/2017 | Wu | G06F 1/305 |
| 2019/0094936 A1* | 3/2019 | Cook | G06F 1/266 |
| 2020/0343718 A1* | 10/2020 | Chan | H02H 9/001 |
| 2021/0075214 A1* | 3/2021 | Schaevitz | H02M 3/156 |
| 2021/0255654 A1* | 8/2021 | Chan | G05F 1/575 |
| 2021/0305814 A1* | 9/2021 | Baby | G06F 1/3218 |
| 2022/0069710 A1* | 3/2022 | Vispute | H02M 1/08 |

* cited by examiner

*Primary Examiner* — Volvick Derose

(57) ABSTRACT

Systems and apparatus for delivering power to a BMC include: a rack unit, a PSU providing power to a power supply voltage rail, servers installed in the rack unit, a plurality of BMCs, with each BMC coupled to one of the servers and configured to monitor one or more components of the server, and a BMC voltage regulator system including a power input coupled to the power supply voltage rail, a decoupling diode that includes an input coupled to the power input, a capacitor bank coupled to an output of the decoupling diode, and a buck/boost VRD having an input coupled to the capacitor bank and an output coupled to one of the BMCs.

20 Claims, 3 Drawing Sheets

BASEBOARD MANAGEMENT CONTROLLER POWER DELIVERY

BACKGROUND

Field of the Disclosure

The field of the disclosure is data processing, or, more specifically, methods, apparatus, and systems for delivering power to a BMC (baseboard management controller).

Description of Related Art

When power fails on a server causing the server to shut down, a BMC can quickly collect and record various data and logs for use in identifying a cause for the shutdown. However, there is often a small amount of time for the BMC to record this data as the power supply may quickly deplete all of its power reserves and cause the server to shut down. For example, a power supply may supply power (such as at 12V) to a server, and also to a BMC, via power supply voltage rails, such as switched rails, standby rails, or redundant rails. The switched rail may be the primary voltage rail used to supply power to the server, with the standby rail used to provide power to the server even when the switched rail is not providing power to the server. When a server's switched and standby rails are both derived from a single PSU (power supply unit) bulk rail, if the PSU suddenly fails, the BMC has to quickly attempt to record the data from components the BMC monitors before the power reserves in the PSU, and the decoupling capacitors in the server, are depleted. If a heavy workload is running during this time, the power can be depleted quickly, preventing the BMC from having enough time to interrogate and record the detailed data from all of the systems monitored by the BMC. Therefore, increasing the amount of time a BMC has to record such data during a shutdown would allow the BMC to record more details about the shutdown.

SUMMARY

Methods, apparatus, and systems for delivering power to a BMC according to various embodiments are disclosed in this specification. In accordance with one aspect of the present disclosure, a system that supports power delivery to a BMC includes: a power input configured to be coupled to a power supply voltage rail, a decoupling diode comprising an input coupled to the power input, a capacitor bank coupled to an output of the decoupling diode, and a buck/boost VRD (voltage regulator device) including an input coupled to the capacitor bank and an output configured to be coupled to a BMC and provide power to the BMC.

In accordance with another aspect of the present disclosure, a method of delivering power to a BMC includes: detecting voltage from the standby rail falling below a threshold, and sending, to the PSU, an override signal instructing the PSU to continue to provide power on the standby rail independent of the voltage of the standby rail failing below an undervoltage limit of the PSU.

In accordance with another aspect of the present disclosure, an apparatus for delivering power to a BMC includes: a rack unit, a PSU providing power to a power supply voltage rail, servers installed in the rack unit, BMCs, each BMC coupled to one of the servers and configured to monitor one or more components of the server, and a BMC voltage regulator system including: a power input coupled to the power supply voltage rail, a decoupling diode including an input coupled to the power input, a capacitor bank coupled to an output of the decoupling diode, and a buck/boost VRD including an input coupled to the capacitor bank and an output coupled to one of the BMCs.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
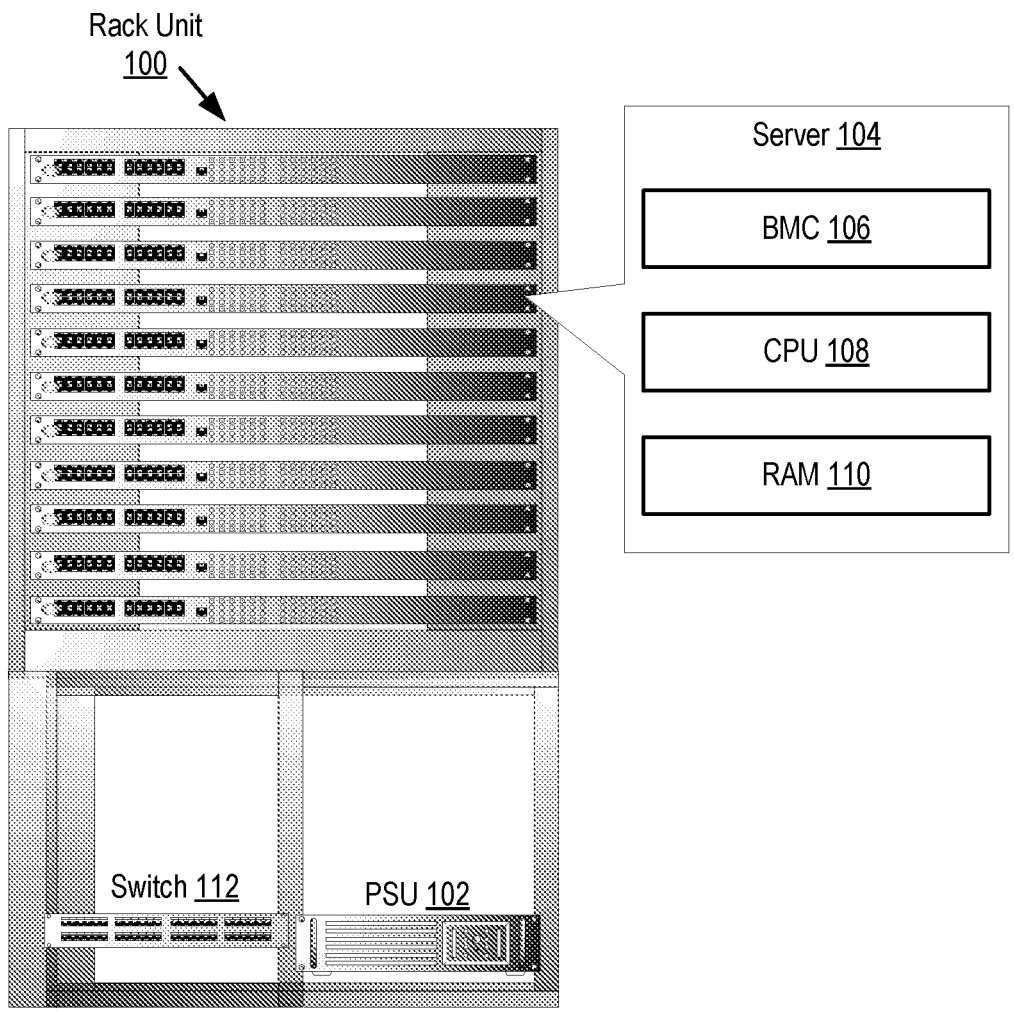
FIG. 1 shows an example line drawing of an apparatus configured for delivering power to a BMC in accordance with embodiments of the present disclosure.

Exemplary methods, apparatus, and systems for delivering power to a BMC in accordance with the present disclosure are described with reference to the accompanying drawings, beginning with FIG. 1. FIG. 1 sets forth an example line drawing of a rack mounted system configured for delivering power to a BMC in accordance with embodiments of the present disclosure. The example system of FIG. 1 includes a rack unit 100, such as a standard 19 inch rack for mounting multiple electronic equipment modules.

The example rack unit 100 of FIG. 1 includes a PSU 102, a server 104, and a switch 112. The PSU 102 converts main AC power to low-voltage regulated DC (direct current) power for the internal components of the rack unit 100. The server 104 includes a BMC 106, a CPU (central processing unit) 108, and main computer memory in the form of RAM (Random Access Memory) 110. The switch 112 may be a network switch that connects components within the rack unit 100 to a computer network.

The example server 104 of FIG. 1 may be one of multiple servers included in the rack unit 100. The BMC 106 may be included within the server 104, as shown in FIG. 1, or may be positioned in the backplane of the rack unit, exterior to the server. In one embodiment, there is a BMC for each server included within the rack unit. In another embodiment, a BMC may be coupled to multiple servers of the rack unit. The example server 104 and its components, such as BMC 106, receives power from the PSU 102 in the form of low-voltage regulated DC power.

The example power supply 102 of FIG. 1 may deliver power to the components of the rack unit at regulated DC voltages. The voltage being delivered by the PSU is referred to as a power supply rail or voltage rail. For example, the PSU 102 may be configured to deliver regulated 12 volt DC to the components of the rack unit via a power supply voltage rail. The PSU 102 may be configured to supply a voltage via a standby voltage rail as well. A standby voltage rail provides power for components utilized in a standby state, even when the main or primary power supply voltage rail is not supplying power to other components. That is, even when the primary power supply voltage rail of the PSU is powered off, some of the components of a computing system are provided power via the standby power rail so that most of the computing system can be powered off after preparing for hibernation or shutdown and powered back on relatively quickly by an event. The standby voltage is supplied by a standby rail from the PSU, and provides regulated DC voltage, such as 5V, 12V, or some other regulated voltage. In the example of FIG. 1, the PSU 102 is included within the rack unit and delivers power to the components of the rack unit. In another embodiment, there may be a PSU for each server 104 included within the rack unit.

In the example rack unit 100 of FIG. 1, the BMC 106, when the voltage on the power supply voltage rail drops, is configured to collect and record data about the power failure and the shutdown of the server 104 affected by the power failure. Collecting such data helps to provide users with details about the shutdown and the power failure event. The PSU may be configured with an undervoltage limit, which causes the PSU to cease delivering power on the power supply voltage rail once the voltage on the rail drops below a predetermined threshold. Such an undervoltage limit protects the components receiving power from the PSU, by preventing the components from experiencing too high of a current. For example, when the voltage on a 12V rail drops below a threshold, such as 10V, the PSU may be configured to shut down the voltage rail entirely (cease providing any power via the power supply voltage rail).

Figure 2:
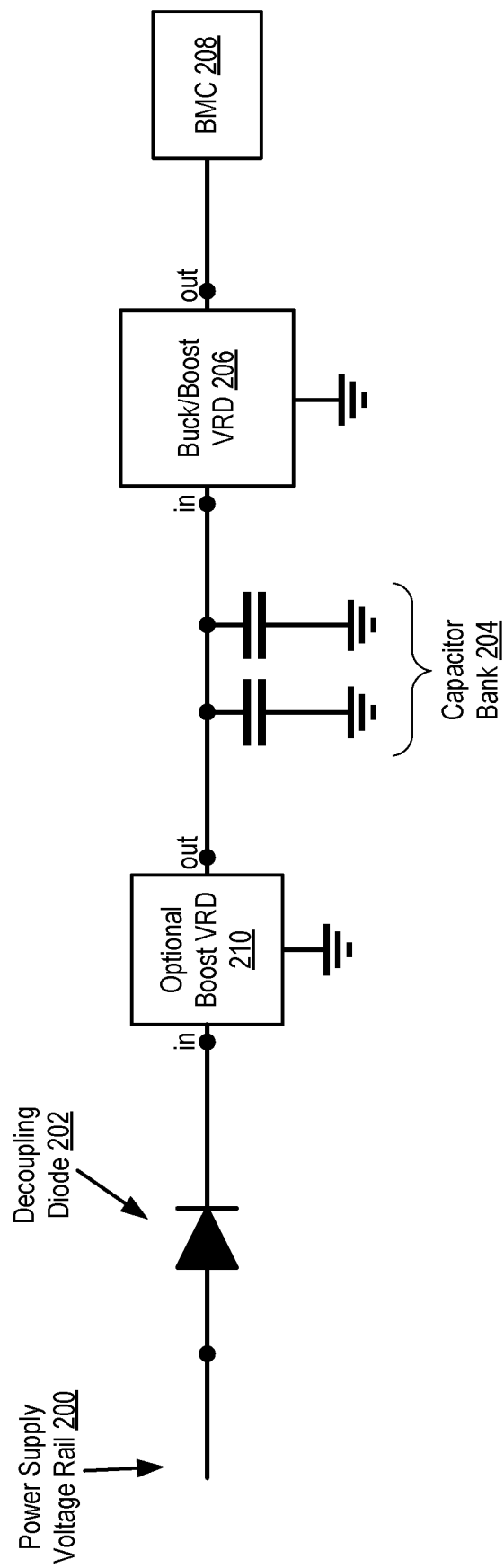
FIG. 2 shows an example line drawing of a system configured for delivering power to a BMC in accordance with embodiments of the present disclosure.

For further explanation, FIG. 2 sets forth an example line drawing of a system configured for delivering power to a BMC in accordance with embodiments of the present disclosure. The example system of FIG. 2 includes a power supply voltage rail 200, a decoupling diode 202, a capacitor bank 204, a buck/boost VRD 206, a BMC 208, and an optional boost VRD 210.

In the example system of FIG. 2, the BMC 208 is coupled to an output of the buck/boost VRD 206. The example BMC 208 may be coupled to a server, similar to the BMC 106 of FIG. 1. When the voltage on the power supply voltage rail 200 drops, the BMC 208 is configured to collect and record data about the power failure. The example system of FIG. 2 is configured to prolong the time the BMC can be powered on during a PSU power failure, providing sufficient power to the BMC, for an additional amount of time, to collect and record data about the power failure. The example system of FIG. 2 is one embodiment of the present disclosure. In other embodiments of the present disclosure, the system may include any combination of the components included in FIG. 2.

In the example system of FIG. 2, the power supply voltage rail 200 is configured to deliver regulated DC power to the BMC 208 from a power supply unit (not shown in FIG. 2), such as the PSU 102 of FIG. 1, and is coupled to the decoupling diode 202. The power supply voltage rail 200 may be any voltage rail supplied by a power supply unit, such as a main rail or a standby rail or redundant rail. A redundant rail may be a backup voltage rail that is used whenever the main voltage rail fails to continue to supply power. For example, the power supply voltage rail 200 may be a 12V standby rail, where the power supplied by the rail to the decoupling diode is 12V of regulated DC power. The amount of input voltage being delivered on the voltage rail may be monitored by the BMC 208 or may be known from signals sent from the PSU to the BMC.

In the example system of FIG. 2, the buck/boost VRD 206 includes an input coupled to the capacitor bank 204 and an output coupled to a BMC 208. The output is configured to provide power from the VRD 206 to the BMC 208. The example buck/boost VRD 206 is a DC to DC converter that is configured to output a voltage that may be greater than the input voltage (in boost mode) or lesser than the input voltage (in buck mode). In one embodiment, the buck/boost VRD 206 is a buck/boost SEPIC (single-ended primary-inductor converter) VRD. When in 'buck mode,' the buck/boost VRD 206 is steps down the voltage, while stepping up the current, from its input to its output. When in 'boost mode,' the buck/boost VRD 206 steps up the voltage, while stepping down the current, from its input to its output. When the PSU is operational, and the power supply voltage rail 200 is delivering its standard voltage, such as 12V, the buck/boost VRD 206 operates in buck mode, delivering a lower voltage to the BMC 208. The maximum voltage required by the BMC may be less than the 12V voltage regularly delivered by the PSU. For example, the maximum voltage required by the BMC may be 3.3V. In such an example, when the PSU is operational, and the power supply voltage rail 200 is delivering its standard 12V of power, the buck/boost VRD 206 operates in buck mode, stepping down the voltage delivered to the BMC 208 to 3.3V.

In the example system of FIG. 2, when the voltage on the input of the buck/boost VRD 206 drops below a minimum voltage required by the BMC 208, the buck/boost VRD 206 switches from buck mode to boost mode, stepping up the voltage delivered to the BMC 208 to at least its minimal required voltage, such as 3.3V. In some embodiments, the minimum voltage required by the BMC may be the same or less than the maximum voltage required by the BMC. When in boost mode, the buck/boost VRD 206 may prolong the amount of time that the BMC 208 receives required regulated power at the minimum voltage, allowing the BMC more time (relative to conventional systems that do not employ a buck/boost VRD) to collect and store data during a power failure. An output of the example buck/boost VRD 206 of FIG. 2 may be configured to be coupled to other components in addition to the BMC 208 of FIG. 2. For example, the buck/boost VRD 206 may be configured to provide regulated power to additional BMCs, subsystems of the BMC 208, and the like.

In the example system of FIG. 2, the capacitor bank 204 is coupled to the decoupling diode 202 and the input of the buck/boost VRD 206. The capacitor bank may include one or more capacitors that each store electrical energy. The capacitors within the capacitor bank 204 store electrical energy as power is being delivered via the power supply voltage rail 200 and become fully charged once the voltage of the capacitor matches the voltage on the power supply voltage rail, such as 12V for a 12V voltage rail, or equal to the voltage on the power supply voltage rail less the forward voltage drop of the decoupling diode 202. Increasing the number of capacitors included within the capacitor bank 204 increases the total capacitance or stored energy in the capacitor bank. When the power on the power supply voltage rail drops, the capacitor bank 204 may release stored energy to make up for the voltage loss and continue to supply a constant voltage, via the buck/boost VRD 206, to the BMC 208. The capacitor bank 204 provides power to the buck/boost VRD 206 even after the power supply voltage rail ceases to provide power, thereby prolonging the amount of time that the BMC 208 receives regulated power. When the capacitor bank 204 is fully charged, the buck/boost VRD 206 operates in buck mode. However, if the power supply voltage rail 200 fails, the energy and voltage in the capacitor bank 204 will being to decrease and, eventually, the capacitor bank voltage will become lower than the voltage that the BMC requires to operate. At this point, the buck/boost VRD 206 changes to boost mode in order to extract the maximum amount of energy from the capacitor bank 204. The example system of FIG. 2 may also include additional VRDs (not shown) coupled to the output of the buck/boost VRD 206, such as VRDs for additional BMCs or BMC subsystems.

In the example system of FIG. 2, the decoupling diode 202 is coupled to the power supply voltage rail 200 and the capacitor bank 204. The example decoupling diode 202 is configured to allow current to pass through it from the power supply voltage rail 200 to the capacitor bank 204, but prevents current from flowing in the opposite direction, such as from the capacitor bank 204 to the power supply voltage rail 200. When voltage from the power supply voltage rail decreases to a particular threshold, the decoupling diode 202 is configured to prevent current from backflowing from the capacitor bank towards the PSU, thereby reserving the energy in the capacitor bank exclusively for the BMC 208. The decoupling diode 202 is configured to isolate the power supply voltage rail 200 from the capacitor bank 204, the buck/boost VRD 206, and the BMC 208 when voltage of the power supply voltage rail 200 falls below the threshold. For example, the threshold may be a voltage equal to the voltage supplied on the power supply voltage rail minus the forward voltage of the diode. In an example system with a 12V power supply voltage rail and a diode having a 0.7V forward voltage, the decoupling diode may isolate the power supply voltage rail from the rest of the system when voltage on the power supply voltage rail falls below 11.3V. In other embodiments, the threshold may be set at some other value above or below 11.3V. The example decoupling diode 202 may include a voltage drop over the diode (based on the forward voltage of the diode, for example), such as 0.7V.

In the example system of FIG. 2, the optional boost VRD 210 includes an input coupled to the decoupling diode 202 and an output coupled to the capacitor bank 204. The example optional boost VRD 210 is a DC to DC converter with an output voltage greater than the input or source voltage. The boost VRD 210 or 'step-up converter' is configured to step up the voltage, while stepping down the current, from its input to its output. The example boost VRD 210 of FIG. 2 is configured to increase the amount of energy provided to the capacitor bank 204, because the output voltage of the optional boost VRD 210 is stepped up from 12V. For example, in a system in which the output voltage of the optional boost VRD 210 is stepped up from 12V to 24V, the amount of energy that is stored by the capacitor bank 204 is increased significantly (relative to a system with only a 12V input to the capacitor bank). The example boost VRD 210 of FIG. 2 is optional and may be included in order to increase the efficiency of the system of FIG. 2. For example, including the optional boost VRD 210 within the system of FIG. 2 increases the amount of time that the capacitor bank 204 will last while providing stored power to the buck/boost VRD 206 when input voltage from the power supply voltage rail drops below the threshold. Alternatively, rather than increasing the amount of time that the capacitor bank can continue to provide power to the buck/boost VRD 206, the optional boost VRD 210 within the system may allow for a smaller capacitor bank 204 design (relative to a system without the optional boost VRD 210) while maintaining the same performance. That is, because a capacitor's energy storage is proportional to the square of the applied voltage ($E=\frac{1}{2}*C*V^2$), increasing the voltage from the PSU allows for a decrease in the size of the capacitor bank while maintaining the same performance. Capacitors are conventionally relatively large components and require a larger surface area on a PCB or IC than other components. As such, reducing the number of capacitors required in a capacitor bank to provide the same performance results in a more efficient area utilization of such a PCB or IC.

In one example embodiment of the present disclosure, a PSU, such as PSU 102 of FIG. 1, provides 12V of power on a power supply voltage rail 200 to be delivered to a server having a BMC, such as the BMC 208 of FIG. 2. Under normal operation of the PSU, power flows through the decoupling diode 202, charges up the capacitors in the capacitor bank 204, and is then stepped down, via the buck/boost VRD 206, to 3.3V and is delivered to the BMC 208. In such an example, the optional boost VRD 210 may output 24V, thereby charging each of the capacitors in the capacitor bank 204 to 24V, thereby increasing the energy stored by the capacitor bank 204.

When the PSU experiences a power failure, the voltage on the 12V power supply voltage rail 200 begins to drop. Once the voltage on the power supply voltage rail 200 drops past a threshold amount, such as at 11.3V, the decoupling diode 202 isolates the power supply voltage rail 200 from the capacitor bank 204, the buck/boost VRD 206, and the BMC 208, thereby preventing current from backflowing from the capacitor bank 204 towards the PSU. This isolation by the decoupling diode 202 reserves the energy in the capacitor bank 204 exclusively for the BMC 208. At this point, the capacitor bank 204, which is now effectively acting as the power supply for the BMC 208, supplies energy to the buck/boost VRD 206, begins to drain, and maintains the voltage on the input of the buck/boost VRD 206. As the capacitor bank 204 drains, the voltage on the input of the buck/boost VRD 206 begins to drop. When the voltage on the input of the buck/boost VRD 206 drops past the minimum voltage required by the BMC 208, the buck/boost VRD 206 switches to boost mode to continue to provide the required voltage to the BMC 208.

As described in the above example embodiment of the present disclosure, each of the components of the system of FIG. 2 are configured to increase the amount of time the BMC has to collect and record data during a power failure event. In such an example, the power supply voltage rail 200 may be a redundant or standby rail that is utilized after the main rail has already failed. Accordingly, the system of FIG. 2 may operate to prolong the time the BMC can be powered on even after the standby rail of the PSU has failed. In one embodiment, the system of FIG. 2 may be included within the rack unit 100 of FIG. 1 for each BMC on the rack unit.

Figure 3:
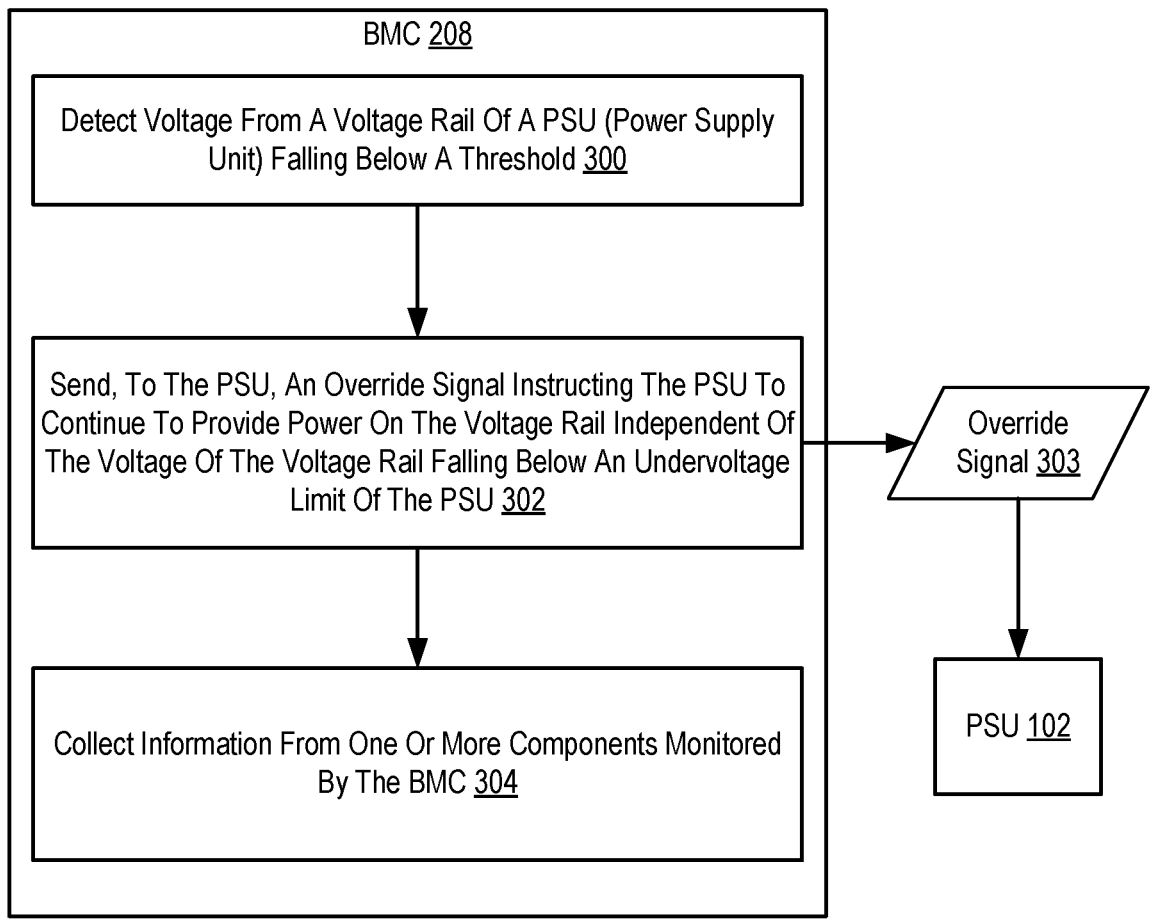
FIG. 3 is a flowchart of an example method for delivering power to a BMC according to some embodiments of the present disclosure.

For further explanation, FIG. 3 sets forth a flow chart illustrating an exemplary method for delivering power to a BMC according to embodiments of the present disclosure. The method of FIG. 3 includes detecting 300 voltage from a voltage rail of a PSU falling below a threshold. Detecting 300 voltage from a voltage rail falling below a threshold may be carried out by the BMC 208 of FIG. 2 comparing the voltage on the power supply voltage rail with a predetermined threshold. The voltage being delivered on the power supply voltage rail may be monitored by the BMC 208 or may be known from signals sent from the PSU to the BMC. The predetermined threshold may be set by an administrator through a configuration system, determined by the BMC at initialization and discovery of components through querying of the components, and in other ways as will occur to those of skill in the art. The predetermined threshold may be set at a value that is higher than a known undervoltage limit of the PSU. An undervoltage limit is a lower voltage threshold set by the PSU, usually during manufacturing of the PSU, that is utilized as part of a undervoltage protection feature for the PSU. A PSU configured with undervoltage protection is designed to automatically shut off (cease providing power)

when the voltage being delivered by the PSU falls below the undervoltage limit. Shutting off the PSU when the voltage drops below the undervoltage limit protects both the PSU and the components receiving power from the PSU. In an example where the PSU is configured with an undervoltage limit of 5V, the BMC may detect when the voltage on a power supply voltage rail falls below a threshold set at 6V.

The method of FIG. 3 also includes sending 302, to the PSU 102, an override signal 303 instructing the PSU to continue to provide power on the standby rail independent of the voltage of the standby rail falling below an undervoltage limit of the PSU. Sending 302 an override signal to the PSU may be carried out by the BMC 208 sending instructions to the PSU over a management or configuration network. Upon receiving the override signal 303, the PSU 102 may continue to provide power on the power supply voltage rail, even after the voltage on a power supply voltage rail falls below the undervoltage limit of the PSU. Continuing with the above example, where the PSU is configured with an undervoltage limit of 5V, the BMC may send an override signal to the PSU when it detects that the voltage on a power supply voltage rail falls below a threshold set at 6V. In such an example, the PSU will continue to provide power on the power supply voltage rail, even after the voltage on a power supply voltage rail falls below 5V, thereby providing the BMC 208 with additional regulated power and in turn providing more time for the BMC to collect and store data during a power failure.

The method of FIG. 3 also includes collecting 304, by the BMC 208, information from one or more components monitored by the BMC. Collecting 304 information from one or more components monitored by the BMC may be carried out by the BMC collecting data from multiple components, such as RAM, the PSU, a CPU, peripheral component controllers, temperature monitors, fan controllers, and the like, and storing the collected data in memory to provide information to users about the state of the system during the power failure. The BMC may monitor any components within the rack unit 100, such as servers, components within the servers, the PSU, and the like. The method described in FIG. 3, as well as the system of FIG. 2, increases the amount of time that the BMC has to collect information from one or more components monitored by the BMC during a power failure (relative to systems without a buck/boost VRD). Increasing the amount of time that the BMC has to collect information allows the BMC to be able to record more details about the power failure and the system shutdown.

In view of the explanations set forth above, readers will recognize that the benefits of delivering power to a BMC according to embodiments of the present disclosure include increased BMC performance during power failures when systems are shutting down; improved methods for delivering power to a BMC by instructing the PSU to override its normal behavior of responding to undervoltage limits during power failures; and others as will occur to readers of skill in the art.

The flowchart and block diagrams in the Figures illustrate the architecture, functionality, and operation of possible implementations of systems, methods, and apparatus according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A system comprising:
    a power input configured to be coupled to a power supply voltage rail;
    a decoupling diode comprising an input coupled to the power input;
    a capacitor bank coupled to an output of the decoupling diode; and
    a buck/boost VRD (voltage regulator device) comprising an input coupled to the capacitor bank and an output configured to be coupled to a BMC (baseboard management controller) and provide power to the BMC, wherein the capacitor bank is positioned between the output of the decoupling diode and the input of the buck/boost VRD.

2. The system of claim 1, wherein the buck/boost VRD is configured to step down, at the output of the buck/boost VRD, voltage received at the input of the buck/boost VRD when the voltage is greater than a buck threshold.

3. The system of claim 1, wherein the buck/boost VRD is configured to step up, at the output of the buck/boost VRD, voltage received at the input of the buck/boost VRD when the voltage is less than a boost threshold.

4. The system of claim 1, wherein the decoupling diode is configured to isolate the power supply voltage rail from the capacitor bank, the buck/boost VRD, and the BMC when voltage of the power supply voltage rail falls below a threshold.

5. The system of claim 1, further comprising a boost VRD between the decoupling diode and the capacitor bank.

6. The system of claim 5, wherein the boost VRD is configured to step up, at an output of the boost VRD, voltage received from the output of the decoupling diode.

7. The system of claim 5, wherein the boost VRD increases a time that the capacitor bank maintains voltage at the input of the buck/boost VRD.

8. The system of claim 1, wherein the power input is coupled to the power supply voltage rail supplied by a PSU (power supply unit) and the power supply voltage rail is a standby rail.

9. The system of claim 8, wherein the output of the buck/boost VRD is coupled to a BMC.

10. The system of claim 9, wherein the BMC is configured to send an override signal to the PSU in response to detecting that voltage of the standby rail is less than a threshold, wherein the override signal instructs the PSU to continue to provide power on the standby rail independent of the voltage of the standby rail falling below an undervoltage limit of the PSU.

11. The system of claim 8, wherein the BMC is configured to collect, until the buck/boost VRD can no longer supply power to the BMC, information from one or more components monitored by the BMC.

12. A method of operating a BMC (baseboard management controller), the BMC coupled to an output of a buck/boost VRD (voltage regulator device), an input of the buck/boost VRD coupled to an output of a decoupling diode, an input of the decoupling diode coupled to a power input configured to be coupled to a standby rail of a PSU (power supply unit), the method comprising:
    detecting voltage from the standby rail falling below a threshold; and
    sending, by the BMC to the PSU, an override signal instructing the PSU to continue to provide power on the standby rail independent of the voltage of the standby rail falling below an undervoltage limit of the PSU.

13. The method of claim 12, further comprising collecting, until the buck/boost VRD can no longer supply power to the BMC, information from one or more components monitored by the BMC.

14. An apparatus comprising:
    a rack unit;
    a PSU (power supply unit) providing power to a power supply voltage rail;
    a plurality of servers installed in the rack unit;
    a plurality of BMCs (baseboard management controllers), each BMC coupled to one of the plurality of servers and configured to monitor one or more components of the server; and
    a BMC voltage regulator system comprising:
        a power input coupled to the power supply voltage rail;
        a decoupling diode comprising an input coupled to the power input;
        a capacitor bank coupled to an output of the decoupling diode; and
        a buck/boost VRD (voltage regulator device) comprising an input coupled to the capacitor bank and an output coupled to one of the BMCs.

15. The apparatus of claim 14 wherein the buck/boost VRD is configured to step down, at the output of the buck/boost VRD, voltage received at the input of the buck/boost VRD when the voltage is greater than a buck threshold.

16. The apparatus of claim 14, wherein the buck/boost VRD is configured to step up, at the output of the buck/boost VRD, voltage received at the input of the buck/boost VRD when the voltage is less than a boost threshold.

17. The apparatus of claim 14, wherein the decoupling diode is configured to isolate the power supply rail from the capacitor bank and the buck/boost VRD when voltage of the power supply rail falls below a threshold.

18. The apparatus of claim 14, further comprising a boost VRD between the decoupling diode and the capacitor bank, and the boost VRD is configured to step up, at an output of the boost VRD, voltage received from the output of the decoupling diode.

19. The apparatus of claim 18, wherein the boost VRD increases a time that the capacitor bank maintains voltage at the input of the buck/boost VRD.

20. The apparatus of claim 14, wherein the power supply voltage rail is a standby rail and the BMC coupled to the output of the buck/boost VRD is configured to send an override signal to the PSU in response to detecting that voltage of the standby rail is less than a threshold, wherein the override signal instructs the PSU to continue to provide power on the standby rail independent of the voltage of the standby rail falling below an undervoltage limit of the PSU.

* * * * *